(12) United States Patent
Eichele et al.

(10) Patent No.: US 11,254,328 B2
(45) Date of Patent: Feb. 22, 2022

(54) APPARATUS AND METHOD FOR USING COMPONENTS OF A VEHICLE

(71) Applicant: Dr. Ing. h.c. F. Porsche Aktiengesellschaft, Stuttgart (DE)

(72) Inventors: Ralf Eichele, Stuttgart (DE); Malte Baumann, Murr (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 113 days.

(21) Appl. No.: 16/689,265

(22) Filed: Nov. 20, 2019

(65) Prior Publication Data

US 2020/0231171 A1 Jul. 23, 2020

(30) Foreign Application Priority Data

Jan. 18, 2019 (DE) .......................... 102019101314.3

(51) Int. Cl.
*B61L 5/00* (2006.01)
*G01C 23/00* (2006.01)
(Continued)

(52) U.S. Cl.
CPC ........ *B60W 50/14* (2013.01); *B60W 50/0098* (2013.01); *B60R 16/03* (2013.01);
(Continued)

(58) Field of Classification Search
CPC .. B60W 50/0098; B60W 60/00; B60W 50/14; B60W 50/023; B60W 50/00;
(Continued)

(56) References Cited

U.S. PATENT DOCUMENTS 9,527,394 B1 * 12/2016 Tang .................... B60K 1/00
10,093,195 B2 * 10/2018 Ricci .................. B60L 53/12
(Continued)

FOREIGN PATENT DOCUMENTS

DE 102016223981 A1 6/2018

OTHER PUBLICATIONS

Research on an intelligent behavior evaluation system for unmanned ground vehicles; Y Sun, H Yang, F Meng—Energies, 2018—mdpi. com (from Energies 2018, 11(7), 1764; https://doi.org/10.3390/en11071764 ) (year: 2018).*

(Continued)

*Primary Examiner* — Cuong H Nguyen
(74) *Attorney, Agent, or Firm* — RatnerPrestia

(57) ABSTRACT

Method and apparatus for using components of a vehicle. The apparatus includes a computing device and a memory for instructions and an interface for components of the vehicle. The computing device is designed to control the components of the vehicle when the instructions are executed by the computing device. A first component is required for an automated driving mode of the vehicle and a second component are designed in a redundant manner with respect to one another. At least one load of the second component for an automated driving mode is either switched on or at least partially switched off depending on a condition. The condition characterizes the need for redundant operation of the first component and of the second component.

20 Claims, 2 Drawing Sheets

(51) Int. Cl.
  *B60W 50/14* (2020.01)
  *B60W 50/00* (2006.01)
  *B60R 16/03* (2006.01)
  *B60W 10/26* (2006.01)

(52) U.S. Cl.
  CPC .............. *B60W 10/26* (2013.01); *Y02T 10/62* (2013.01); *Y02T 10/70* (2013.01)

(58) Field of Classification Search
  CPC ......... Y02T 10/62; Y02T 10/70; B60R 16/03; B61L 5/00
  USPC ...................................................... 701/24, 22
  See application file for complete search history.

(56) References Cited

U.S. PATENT DOCUMENTS

| | | | | |
|---|---|---|---|---|
| 10,427,530 | B2* | 10/2019 | Ricci | B60L 53/14 |
| 10,507,830 | B2* | 12/2019 | Kelly | B60W 30/19 |
| 2006/0080585 | A1* | 4/2006 | Kiryu | G01R 31/3187 |
| | | | | 714/733 |
| 2009/0048050 | A1* | 2/2009 | Kamada | B60W 10/10 |
| | | | | 475/150 |
| 2012/0280750 | A1* | 11/2012 | Kaehs | H03F 1/52 |
| | | | | 330/192 |
| 2018/0229727 | A1* | 8/2018 | Kelly | F16H 63/42 |
| 2019/0260225 | A1* | 8/2019 | Hida | H02J 7/1423 |
| 2019/0344801 | A1* | 11/2019 | Ishii | G05D 1/0061 |

OTHER PUBLICATIONS

Review of the automatic train control system for Cairo Metro Line 2; MK Banerjee, N EI Hoda—Power Engineering Journal, 1998—ieeexplore.ieee.org; Power Engineering Journal (vol. 12, Issue: 5, Oct. 1998) (year: 1998).*

Hardware and software architecture of intelligent vehicles and road verification in typical traffic scenarios; H Gao, H Yu, G Xie, H Ma, Y Xu, D Li—IET Intelligent Transport Systems, 2018—IET (year: 2018).*

Converting a conventional metro line into automated operation: identifying and managing the safety process of the traffic in migration phase; M Ghantous-Mouawad, 1st IET International Conference on System Safety; p. 217-226 (year: 2006).*

Jiskra P., Strauß P., Schwertberger W. (2019) aFAS—an abstract of "How to Get a Driverless Prototype on the Road?". In: Bertram T. (eds) Fahrerassistenzsysteme 2018. Proceedings. Springer Vieweg, Wiesbaden, https://doi.org/10.1007/978-3-658-23751-6_15 (Year: 2019).*

Nanjappan, V.; Shi, R.; Liang, H.-N.; Lau, K.K.-T.; Yue, Y.; Atkinson, K. Towards a Taxonomy for In-Vehicle Interactions Using Wearable Smart Textiles: Insights from a User-Elicitation Study. Multimodal Technol. Interact. 2019, 3, 33. https://doi.org/10.3390/mti3020033 (Year: 2019).*

Yalin Liu et al. Unmanned aerial vehicle for internet of everything: Opportunities and challenges, Computer Communications, vol. 155, 2020, pp. 66-83, ISSN 0140-3664, https://doi.org/10.1016/j.comcom. 2020.03.017; (https://www.sciencedirect.com/science/article/pii/S0140366419318754) (Year: 2020).*

* cited by examiner

APPARATUS AND METHOD FOR USING COMPONENTS OF A VEHICLE

CROSS-REFERENCE TO RELATED APPLICATION

This application claims priority to German Patent Application No. 10 2019 101 314.3, filed Jan. 18, 2019, the content of such application being incorporated by reference herein in its entirety.

FIELD OF THE INVENTION

The invention relates to an apparatus and a method for using components of a vehicle.

BACKGROUND OF THE INVENTION

Vehicles provided for highly automated driving from level 4 and above, that is to say high degree of automation, contain a multiplicity of control devices and sensors which are responsible for implementing the functionality.

Since the driver can attend to other activities which do not correspond to vehicle guidance during the automated driving mode, very high requirements are imposed on safety.

These requirements are stipulated, inter alia, according to ISO 26262 and, for this degree of automation, necessitate a redundant design of sensors and control devices.

If a safety-relevant control device or a sensor fails, at least one further control device or sensor is available as a fallback level.

After the vehicle has been started, all systems in the vehicle are active and communicate with one another via communication buses, for example Ethernet, Flexray, CAN, etc. So that this is possible, all systems are supplied with power.

SUMMARY OF THE INVENTION

It may be desirable to specify a method for using components of a vehicle which is improved in comparison.

The method for using components of a vehicle provides for a first component required for an automated driving mode of the vehicle and a second component to be designed in a redundant manner with respect to one another, wherein at least one load of the second component for an automated driving mode is operated either in a switched-on manner or in an at least partially switched-off manner depending on a condition, wherein the condition characterizes the need for redundant operation of the first component and of the second component. The second component is, for example, a secondary component as a fallback level for the first component used during normal operation of the vehicle. Highly automated driving will be initially approved only on special routes, for example freeway sections, which comply with particular prerequisites, for example minimum number of lanes, no constrictions, no roadworks, sufficient environmental information relating to the route, etc. As a result of the condition, the second component is operated in a switched-off manner in a quiescent state if highly automated driving has not been approved since it is not necessarily required as a fallback level in this case. Otherwise, the second component is operated, for example, according to ISO 26262-1:2011 or newer if it is required as a redundant component.

The load is preferably supplied with energy via a switchable supply path, wherein the supply path is switched off if the condition has been satisfied. The power supply to the load is therefore interrupted, for example, and the consumption of the vehicle is reduced overall. This increases the range, in particular of an electric vehicle.

The load is preferably switched to a quiescent state via a signal if the condition has been satisfied. Control is therefore effected via a communication bus, for example.

The signal is preferably monitored in the quiescent state, in particular of the second component, wherein at least one function of the load is switched off. The component can therefore be activated from the quiescent state by means of the signaling.

The first component and the second component are preferably operated in a switched-on manner at least in an initialization phase after the vehicle has been started. For protection and driver information, all systems are started and initialized in this manner when starting the vehicle, that is to say when starting up the communication buses. It is therefore ensured at the beginning of the journey that all systems are fundamentally ready and fault-free. If this is not the case, this is communicated to the driver by means of a message, for example, and the function of highly automated driving is blocked or deactivated.

After this check, the secondary components are deactivated and changed to the quiescent state.

BRIEF DESCRIPTION OF THE DRAWINGS

Further advantageous configurations emerge from the following description and the drawing, in which FIG. 1 schematically shows an apparatus for using components of a vehicle.

DETAILED DESCRIPTION OF THE INVENTION

Figure 1:
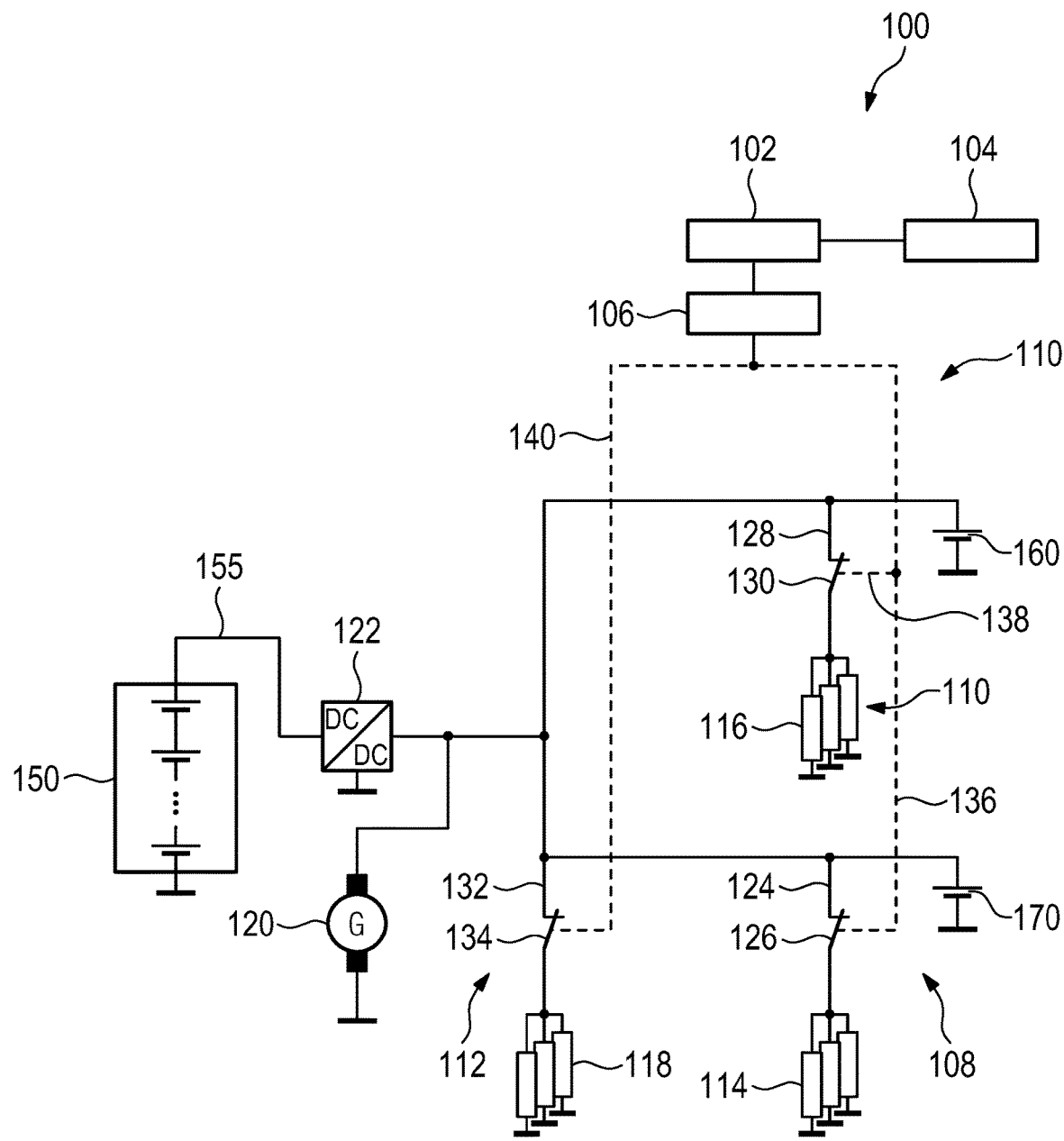

FIG. 1 schematically illustrates an apparatus 100 for using components of a vehicle.

The apparatus comprises a computing device 102 and a memory 104 for instructions and an interface 106. These are connected using data lines.

The vehicle comprises a first component 108, a second component 110 and a third component 112 of the vehicle. The first component 108 and the second component 110 are designed in a redundant manner with respect to one another in the example. For example, these components can be operated according to ISO 26262-1:2011 or newer. One or more loads 118 contained in the third component 112 correspond to a load circuit which, in comparison with the loads contained in the first component 108 and the second component 110, must be able to be isolated in a non-reactive manner according to ISO 26262-1:2011 or newer. In the example, the first component 108 and the second component 110 are partial energy networks according to the Automotive Safety Integrity Level, ASIL, which represent the redundancy. The loads of the third component 112 are assigned to the QM classification according to ISO 26262-1:2011 or newer in the example. As a result of the design which can be isolated in a non-reactive manner, the individual loads of the third component cannot have any retroactive effect on the other components.

The first component 108 comprises at least one first load 114. The second component 110 comprises at least one second load 116. The third component 112 comprises at least one third load 118.

In the example, the vehicle has an internal combustion engine which can drive a generator 120 for the purpose of supplying energy to the loads. In an electric vehicle, the loads are supplied from a corresponding high-voltage battery 150 which is connected to a DC/DC converter 122 via a supply line 155. The loads are supplied on the secondary side of the DC/DC converter 122. The generator 120 and a group comprising the high-voltage battery 150, the supply line 155 and the DC/DC converter 122 can replace each other.

Both the generator 120 and the group comprising the high-voltage battery 150, the supply line 155 and the DC/DC converter 122 may supply and charge low-voltage batteries 170 and 160. If the generator 120 or the group comprising the high-voltage battery 150, the supply line 155 and the DC/DC converter 122 fails, the low-voltage batteries 170 and 160 can supply the loads with energy.

The first load 114 can be supplied with energy from the DC/DC converter 122 and/or the generator 120 via a first supply line 124. In the example, the first supply line 124 can be interrupted by means of a first isolating element 126.

The second load 116 can be supplied with energy from the DC/DC converter 122 and/or the generator 120 via a second supply line 128. In the example, the second supply line 128 can be interrupted by means of a second isolating element 130.

The third load 118 can be supplied with energy from the DC/DC converter 122 and/or the generator 120 via a third supply line 132. In the example, the third supply line 132 can be interrupted by means of a third isolating element 134.

In the example, the interface 106 is connected to the first isolating element 126 via a first signal line 136. The interface 106 is connected to the second isolating element 130 via a second signal line 138 in the example. The interface 106 is connected to the third isolating element 134 via a third signal line 140 in the example.

The separate isolating elements are optional and can be integrated in accordingly configured loads. In this case, the components which comprise the loads are directly connected to the interface 106.

Figure 2:
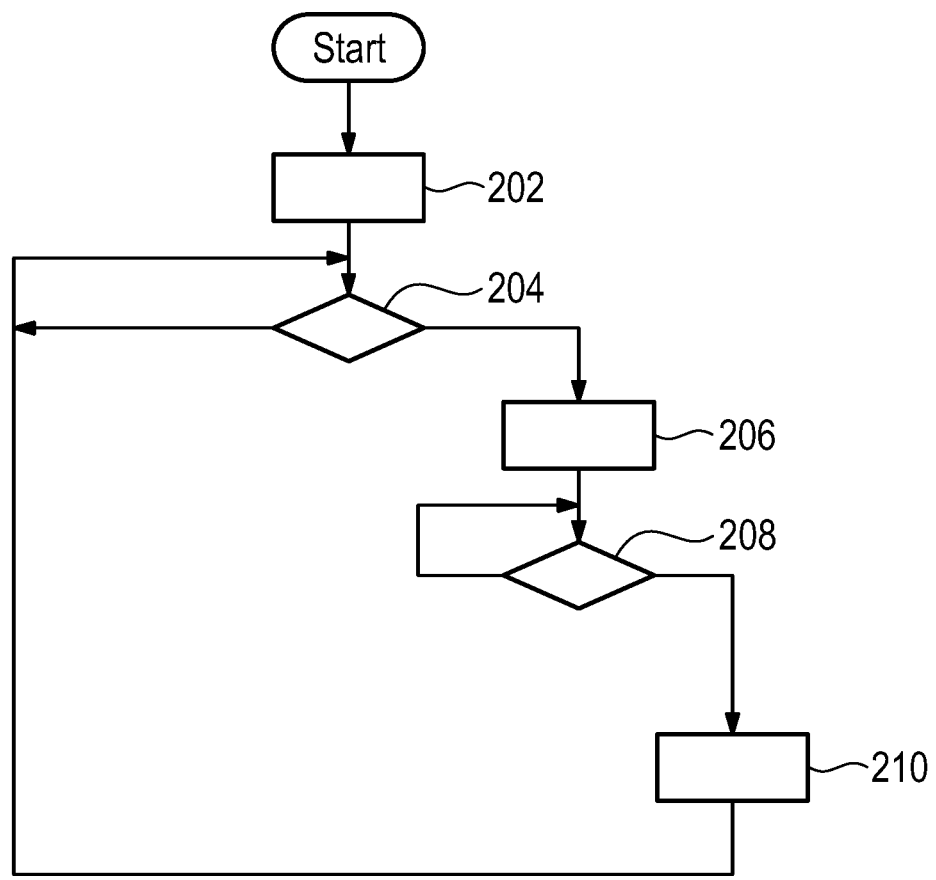
FIG. 2 schematically shows steps in a method for using components.

The computing device 102 is designed to control the components of the vehicle in the method described below on the basis of FIG. 2 when the instructions are executed by the computing device 102.

The method begins, for example, when the vehicle is started. As a result of the method, the first component 108 required for an automated driving mode of the vehicle and the second component 110 are operated either in a redundant manner with respect to one another or not depending on a condition. More precisely, at least one load 116 of the second component 110 for an automated driving mode is either switched on or at least partially switched off depending on a condition. The condition characterizes the need for redundant operation of the first component 108 and of the second component 110.

A step 202 is carried out after the start.

In step 202, the first component 108 and the second component 110 are operated in a switched-on manner at least in an initialization phase after the vehicle has been started.

A step 204 is then carried out.

Step 204 checks whether a condition indicates switching off of the second component 110.

In the example, the condition indicates switching off of the second component 110 if it is determined that the vehicle is outside a route approved for highly automated driving.

The condition may additionally or alternatively also indicate switching off of the second component 110 if a control device required for operation in highly automated driving or a sensor required for this purpose is not available or is defective.

The condition may additionally or alternatively also indicate switching off of the second component 110 if a vehicle parameter, for example a speed of the vehicle, has a value which is impermissible for highly automated driving.

The condition may additionally or alternatively also indicate switching off of the second component 110 if a vehicle function requests a driver of the vehicle to carry out manual driving and the driver has complied with this request in a guaranteed manner.

The condition may additionally or alternatively also indicate switching off of the second component 110 if manual deactivation of highly automated driving by a driver is detected.

If the condition indicates switching off of the second component 110, a step 206 is carried out. Otherwise, step 204 is carried out.

In step 206, the second component 110 is at least partially changed to a quiescent state. In the example, the second isolating unit 130 is controlled via the interface 106 in order to interrupt the second supply line 128. The second load 116 therefore becomes deenergized.

A step 208 is then carried out.

Step 208 checks whether the condition indicates switching on of the second component 110.

In the example, the condition indicates switching on of the second component 110 if it is determined that the vehicle is on a route approved for highly automated driving or approaches said route.

The condition may additionally or alternatively also indicate switching on of the second component 110 if the first component 108 indicates approval for highly automated driving.

The condition may additionally or alternatively also indicate switching on of the second component 110 if manual activation of highly automated driving by a driver is intended to be detected and approved.

If the condition indicates switching on of the second component 110, a step 210 is carried out. Otherwise, step 208 is carried out.

In step 210, the second component 110 is switched on again from the quiescent state. For example, the energy supply is connected again via the second supply line 128. In the example, the second isolating unit 130 is controlled via the interface 106 in order to connect the second supply line 128. The second load 116 is therefore supplied with power.

Step 204 is then carried out.

The second load 116 is supplied with energy via the switchable second supply path 128 in the example. The second supply path 128 is switched off in the example if the condition has been satisfied.

The second load 116 can also be directly switched, via a signal, to a quiescent state in which the second load 116 requires less energy if the condition for switching off has been satisfied.

In this case, the signal is monitored in the quiescent state, in particular at the second component, wherein at least one function of the second load 116 is switched off.

The first load 114 and the third load 118 can be switched in a corresponding manner.

Communication relating to the respective state of the components via communication buses, for example Ethernet, Flexray, CAN, can be used to activate the loads or components from the quiescent state in good time and in a predefined order. In order to enable this, all components are supplied with power in their quiescent state at least for the purpose of monitoring the signals which can be used to switch on the respective component.

The situation, in particular the driving situation of the vehicle or the driver's wish with respect to the activation or deactivation of highly automated driving, can be detected for the purpose of evaluating the condition on the basis of signals which are interchanged via the communication bus.

Saving energy increases the range of the vehicle and reduces the consumption and the associated emissions.

What is claimed is:

1. A method for using components required for an automated driving mode of a vehicle, wherein a first component of said components required for the automated driving mode of the vehicle and a second component of said components of the vehicle are configured in a redundant manner with respect to one another, wherein said first component and said second component are configured to redundantly perform the same operation required for the automated driving mode of the vehicle, said method comprising:
   operating at least one load of the second component for the automated driving mode in a switched-on manner depending on a condition characterized by a need for redundant operation of the first component and of the second component; and
   operating the at least one load of the second component for the automated driving mode in a switched-off manner during operation of the vehicle depending on the condition characterized by the need for redundant operation of the first component and of the second component.

2. The method as claimed in claim 1, further comprising supplying the load with energy via a switchable supply path, and switching off the supply path if the condition has been satisfied.

3. The method as claimed in claim 1, further comprising switching the load to a quiescent state via a signal if the condition has been satisfied.

4. The method as claimed in claim 3, further comprising monitoring the signal in the quiescent state at the second component, and switching off at least one function of the load.

5. The method as claimed in claim 1, further comprising operating the first component and the second component in a switched-on manner at least in an initialization phase after the vehicle has been started.

6. The method as claimed in claim 1, wherein the condition indicates switching off the second component when it is determined that the vehicle is outside of a route approved for highly automated driving, a control device required for operation in highly automated driving or a sensor required for this purpose is not available or is defective, a vehicle parameter has a value which is impermissible for highly automated driving, a vehicle function requests a driver of the vehicle to carry out manual driving, and/or manual deactivation of highly automated driving by a driver is detected.

7. The method as claimed in claim 1, wherein the condition indicates switching on of the second component when it is determined that the vehicle is on a route approved for highly automated driving or approaches said route, the first component indicates approval for highly automated driving, and/or manual activation of highly automated driving by a driver is detected.

8. An apparatus for using components required for an automated driving mode of a vehicle, wherein the apparatus comprises:
   a computing device,
   a memory for instructions, and
   an interface for the components of the vehicle, wherein a first component of said components required for the automated driving mode of the vehicle and a second component of said components required for the automated driving mode of the vehicle are configured in a redundant manner with respect to one another, and wherein said first component and said second component are configured to redundantly perform the same operation required for the automated driving mode of the vehicle,
   wherein the computing device is configured to control the components of the vehicle when instructions are executed by the computing device, and said computing device is configured to (i) operate at least one load of the second component for the automated driving mode in a switched-on manner depending on a condition characterized by a need for redundant operation of the first component and of the second component, and (ii) operate the at least one load of the second component for the automated driving mode in a switched-off manner during operation of the vehicle depending on the condition characterize by the need for redundant operation of the first component and of the second component.

9. The device as claimed in claim 8, wherein the condition indicates switching off the second component when manual deactivation of highly automated driving by a driver is detected.

10. The method as claimed in claim 1, further comprising supplying the first and second component with energy by way of a DC/DC converter.

11. The method as claimed in claim 1, wherein the condition indicates switching off the second component when it is determined that the vehicle is outside of a route approved for highly automated driving.

12. The method as claimed in claim 1, wherein the condition indicates switching off the second component when it is determined that a control device required for operation in highly automated driving or a sensor required for this purpose is not available.

13. The method as claimed in claim 1, wherein the condition indicates switching off the second component when it is determined that vehicle parameter has a value which is impermissible for highly automated driving.

14. The method as claimed in claim 1, wherein the condition indicates switching off the second component when it is determined that a vehicle function requests a driver of the vehicle to carry out manual driving.

15. The method as claimed in claim 1, wherein the condition indicates switching off the second component when manual deactivation of highly automated driving by a driver is detected.

16. The device as claimed in claim 8, further comprising a DC/DC converter that is configured to distribute power to the first and second components.

17. The device as claimed in claim 8, wherein the condition indicates switching off the second component when it is determined that the vehicle is outside of a route approved for highly automated driving.

18. The device as claimed in claim 8, wherein the condition indicates switching off the second component when it is determined that a control device required for operation in highly automated driving or a sensor required for this purpose is not available.

19. The device as claimed in claim 8, wherein the condition indicates switching off the second component when it is determined that vehicle parameter has a value which is impermissible for highly automated driving.

20. The device as claimed in claim 8, wherein the condition indicates switching off the second component when it is determined that a vehicle function requests a driver of the vehicle to carry out manual driving.

\* \* \* \* \*